US009115736B2

(12) United States Patent
Dean et al.

(10) Patent No.: US 9,115,736 B2
(45) Date of Patent: Aug. 25, 2015

(54) WORK VEHICLE FLUID HEATING SYSTEM

(71) Applicant: CNH AMERICA LLC, New Holland, PA (US)

(72) Inventors: Patrick Dean, Chicago, IL (US); Craig Berard, Fargo, ND (US)

(73) Assignee: CNH Industrial America LLC, New Holland, PA (US)

(*) Notice: Subject to any disclaimer, the term of this patent is extended or adjusted under 35 U.S.C. 154(b) by 232 days.

(21) Appl. No.: 13/710,850

(22) Filed: Dec. 11, 2012

(65) Prior Publication Data

US 2013/0167823 A1    Jul. 4, 2013

Related U.S. Application Data

(60) Provisional application No. 61/581,698, filed on Dec. 30, 2011.

(51) Int. Cl.
*B60H 1/22* (2006.01)
*F15B 21/04* (2006.01)
(Continued)

(52) U.S. Cl.
CPC .......... *F15B 21/042* (2013.01); *B60H 1/00314* (2013.01); *B60H 1/22* (2013.01);
(Continued)

(58) Field of Classification Search
CPC ...... B60H 1/038; B60H 1/00314; B60H 1/20; B60H 1/14; B60H 1/22; B60H 1/02; B60H 2001/146; B60H 2001/00307; B60H 1/00335; B60H 1/18; B61D 27/0036; F24D 2200/30; F24J 3/006; F24J 3/02; F24J 3/003; F01P 2007/146; F02N 19/10; F15B 21/042; F15B 2211/20553; F16H 61/4043; F01M 5/001; F01M 5/002; F01M 5/005; E02F 9/2228; E02F 9/2296; E02F 9/226; F28F 27/00; F01N 2610/10; F01N 3/2066

USPC ........ 237/34, 65, 12.3 B, 12.4; 123/142.5 R; 236/92 R, 247; 60/329, 452, 456, 468; 126/247

See application file for complete search history.

(56) References Cited

U.S. PATENT DOCUMENTS 2,101,495 A * 12/1937 Ferris et al. .................... 165/202
2,990,919 A *  7/1961 Christenson et al. .......... 188/274
(Continued)

FOREIGN PATENT DOCUMENTS

DE          3506040 A1   9/1985
EP           210930 A1   2/1987
(Continued)

OTHER PUBLICATIONS

"DE_3506040_A1_M—Machine Trans.pdf"; Machine Translation of DE-3506040; http://epo.org; Sep. 24, 2014.*
(Continued)

*Primary Examiner* — Gregory Huson
*Assistant Examiner* — Daniel E Namay
(74) *Attorney, Agent, or Firm* — Patrick M. Sheldrake; Seyed V. Sharifi T.

(57) ABSTRACT

A fluid heating system for a work vehicle includes a pressurized fluid circuit having a pump for providing pressurized fluid to the fluid circuit. A control module for controlling a first control device is in fluid communication with the fluid circuit, the first control device operable between a first position and a second position. The first position of the first control device permits a load sense pressure to be applied through the first control device, thereby preventing pressurized fluid from the pump flowing to a pressure return tank for heating the pressurized fluid. The second position of the first control device prevents the load sense pressure from being applied through the first control device, thereby permitting pressurized fluid from the pump flowing to a pressure return tank and resulting in heating of pressurized fluid of the fluid circuit.

16 Claims, 4 Drawing Sheets

(51) Int. Cl.
  *F28F 27/00* (2006.01)
  *B60H 1/00* (2006.01)
  *E02F 9/22* (2006.01)
  *F24C 9/00* (2006.01)
  *F25B 41/06* (2006.01)
  *F16D 31/00* (2006.01)
  *F01N 3/20* (2006.01)

(52) U.S. Cl.
  CPC .............. *E02F 9/226* (2013.01); *E02F 9/2228* (2013.01); *E02F 9/2296* (2013.01); *F28F 27/00* (2013.01); *F01N 3/2066* (2013.01); *F01N 2610/10* (2013.01)

(56) References Cited

U.S. PATENT DOCUMENTS

| | | | | |
|---|---|---|---|---|
| 3,451,511 A | * | 6/1969 | Knapp | 188/274 |
| 3,989,127 A | * | 11/1976 | Staudenmaier et al. | 188/296 |
| 4,346,839 A | | 8/1982 | Moser | |
| 4,352,455 A | | 10/1982 | Moser et al. | |
| 4,352,456 A | | 10/1982 | Brandenburg, Jr. | |
| 4,487,364 A | * | 12/1984 | Okulicz et al. | 237/12.3 R |
| 4,523,430 A | * | 6/1985 | Masuda | 60/420 |
| 4,687,138 A | * | 8/1987 | Ostergaard | 239/126 |
| 4,728,029 A | * | 3/1988 | Griebel et al. | 237/12.3 R |
| 4,836,341 A | * | 6/1989 | Hall, III | 188/290 |
| 5,333,679 A | * | 8/1994 | Suzuki et al. | 165/43 |
| 5,333,707 A | * | 8/1994 | Kaneda | 188/296 |
| 5,419,129 A | * | 5/1995 | Becker et al. | 60/452 |
| 5,472,268 A | * | 12/1995 | Ando et al. | 303/117.1 |
| 5,657,838 A | * | 8/1997 | Vogelsang et al. | 188/154 |
| 5,699,665 A | * | 12/1997 | Coolidge | 60/426 |
| 6,167,993 B1 | * | 1/2001 | Adams et al. | 188/296 |
| 6,192,681 B1 | * | 2/2001 | Tsuruga et al. | 60/447 |
| 6,561,324 B2 | * | 5/2003 | Friedrich et al. | 188/296 |
| 6,616,059 B2 | * | 9/2003 | Sabhapathy et al. | 237/12.3 B |
| 6,691,925 B2 | | 2/2004 | Roberts et al. | |
| 8,302,876 B2 | * | 11/2012 | Sanger et al. | 237/12.3 R |
| 8,353,157 B2 | * | 1/2013 | Lech et al. | 60/452 |
| 8,480,006 B2 | * | 7/2013 | Sanger et al. | 237/34 |
| 8,720,196 B2 | * | 5/2014 | Kawasaki et al. | 60/422 |
| 2002/0070068 A1 | * | 6/2002 | Eriksen et al. | 180/306 |
| 2005/0044849 A1 | * | 3/2005 | Berthod et al. | 60/468 |
| 2005/0144938 A1 | * | 7/2005 | Kajita et al. | 60/468 |
| 2005/0205682 A1 | * | 9/2005 | Sanger et al. | 237/10 |
| 2006/0108185 A1 | * | 5/2006 | Bitter | 188/151 R |
| 2006/0191262 A1 | * | 8/2006 | Jackson et al. | 60/452 |
| 2007/0028610 A1 | * | 2/2007 | Yasuda et al. | 60/456 |
| 2007/0056280 A1 | * | 3/2007 | Bitter | 60/468 |
| 2007/0101710 A1 | * | 5/2007 | Brockmann et al. | 60/452 |
| 2007/0295006 A1 | * | 12/2007 | Legner | 60/468 |
| 2008/0238187 A1 | * | 10/2008 | Garnett et al. | 303/112 |
| 2008/0245882 A1 | * | 10/2008 | Sanger et al. | 237/12.3 R |
| 2009/0044528 A1 | * | 2/2009 | Narazaki et al. | 60/452 |
| 2009/0178400 A1 | * | 7/2009 | Sakikawa | 60/468 |
| 2009/0308068 A1 | * | 12/2009 | Yoshino | 60/468 |
| 2012/0031088 A1 | * | 2/2012 | Takebayashi et al. | 60/452 |
| 2013/0047599 A1 | * | 2/2013 | Opdenbosch et al. | 60/464 |

FOREIGN PATENT DOCUMENTS

| | | | | |
|---|---|---|---|---|
| EP | 1144825 | B1 | 9/2003 | |
| JP | 57154502 | A * | 9/1982 | F15B 11/00 |
| JP | 62261613 | A | 11/1987 | |
| JP | 04292215 | A | 10/1992 | |
| JP | 07228132 | A | 8/1995 | |
| JP | 09315132 | A | 12/1997 | |
| WO | 9809025 | A1 | 3/1998 | |

OTHER PUBLICATIONS

"EP_210930_A1_M—Machine Trans.pdf"; Machine Translation of EP-0210930; http://epo.org; Sep. 22, 2014.*

* cited by examiner

WORK VEHICLE FLUID HEATING SYSTEM

FIELD OF THE INVENTION

This invention relates generally to fluid heating systems, and the use thereof, and, more particularly, to vehicle fluid heating systems.

BACKGROUND OF THE INVENTION

In cold climates, it is important to minimize the amount of time needed to warm a vehicle to operating temperature. More specifically, the temperature of the hydraulic oil must be increased to a minimum operating temperature before implement operation, such as a loader, is allowed. In older, fixed-displacement (i.e., constant flow) systems, oil temperatures rose quickly at start-up due to inherent inefficiencies associated with such systems. In contemporary pressure-compensated load-sensing systems, these inefficiencies are reduced to nearly zero when idling. Pressure-compensated load-sensing systems only create hydraulic energy (flow at pressure) when a load signal is present.

Hydraulic oil can be heated by the operator manually by cycling the loader circuit, generating pump flow at high pressure, but this activity can be both fatiguing and time-consuming to the operator.

Accordingly, it would be desirable to provide an automatic process that generated large amounts of pump flow at high pressure, but operating independently of or without resulting in external movement of an implement or requiring continuous input from an operator.

SUMMARY OF THE INVENTION

The present invention relates to a fluid heating system for a work vehicle including a pressurized fluid circuit having a pump for providing pressurized fluid to the fluid circuit. A control module for controlling a first control device is in fluid communication with the fluid circuit, the first control device operable between a first position and a second position. The first position of the first control device permits a load sense pressure to be applied through the first control device, thereby preventing pressurized fluid from the pump flowing to a pressure return tank for heating the pressurized fluid. The second position of the first control device prevents the load sense pressure from being applied through the first control device, thereby permitting pressurized fluid from the pump flowing to a pressure return tank and resulting in heating of pressurized fluid of the fluid circuit.

The present invention further relates to a method for heating a work vehicle including providing a pressurized fluid circuit having a pump for providing pressurized fluid to the fluid circuit. A control module for controlling a first control device is in fluid communication with the fluid circuit, the first control device operable between a first position and a second position. The first position of the first control device permits a load sense pressure to be applied through the first control device, thereby preventing pressurized fluid from the pump flowing to a pressure return tank for heating the pressurized fluid. The second position of the first control device prevents the load sense pressure from the pump being applied through the first control device, thereby permitting pressurized fluid from flowing to a pressure return tank and resulting in heating of pressurized fluid of the fluid circuit. The method further including selectably actuating the first control device between the first position and the second position.

An advantage of the present invention is the capability to rapidly warm hydraulic oil in a hydraulic circuit.

A further advantage of the present invention is the capability to rapidly warm hydraulic oil in a hydraulic circuit operating independent of so as not to result in external movement of an implement or operating independent of so as not to require continuous input from an operator.

It is to be understood that an embodiment of the present invention may incorporate one or more of the identified advantages.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
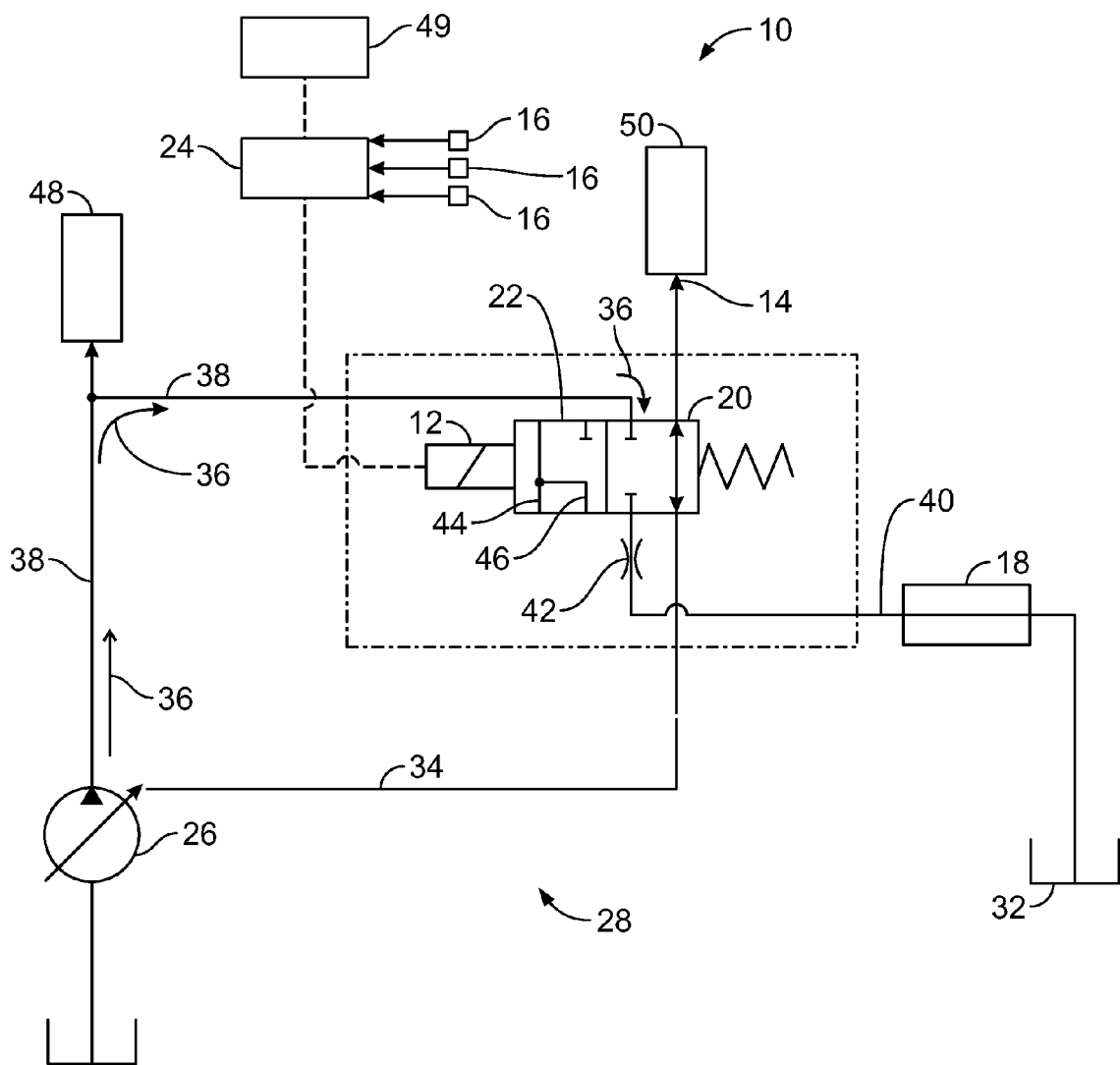
FIGS. 1 and 2 are schematic depictions of an exemplary embodiment of a fluid heating system of the present disclosure.
Figure 2:
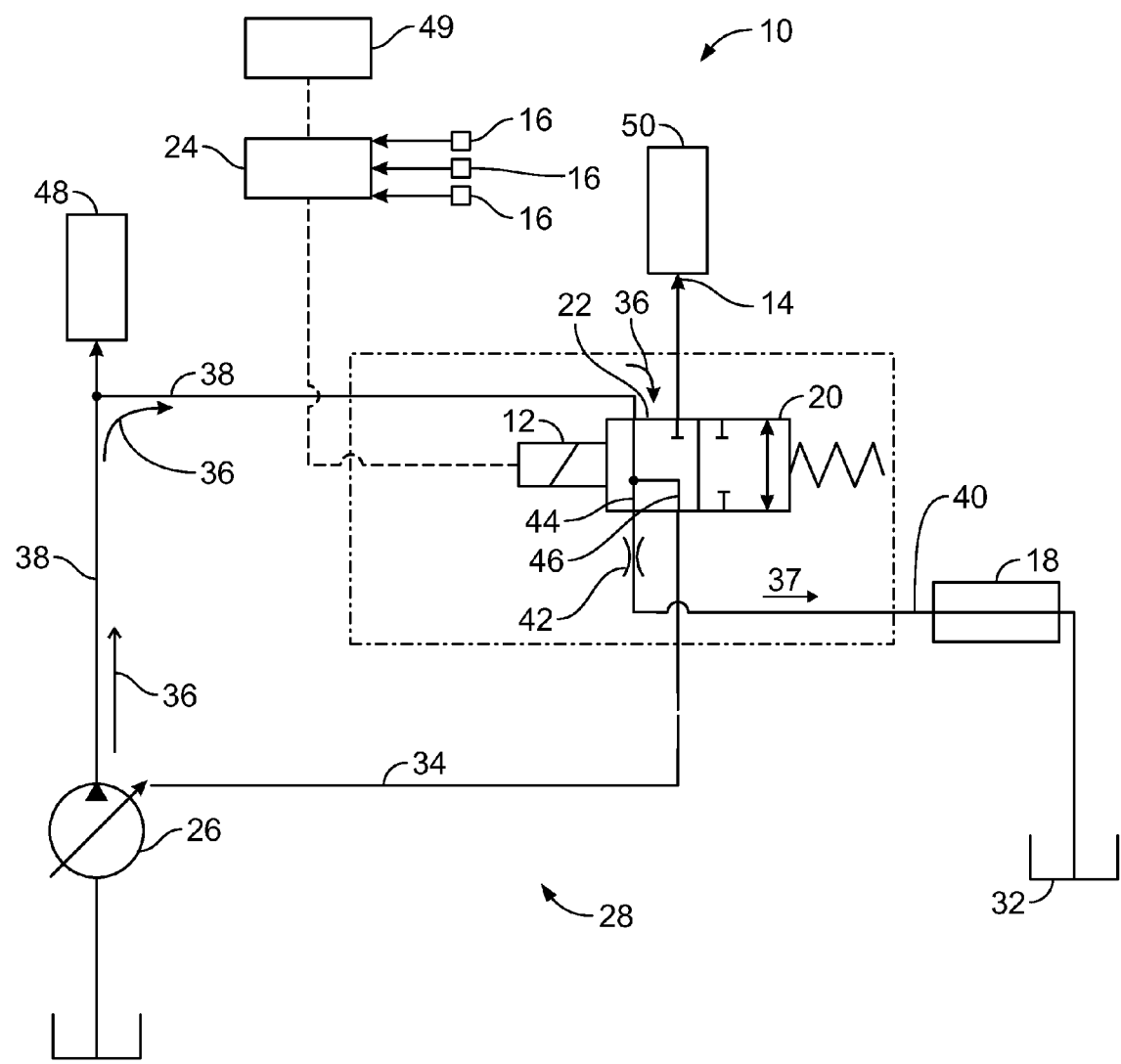

Referring to the drawings, FIGS. 1-2 show schematic representations of an exemplary embodiment of the present disclosure. FIG. 1 shows a fluid heating system 10 including a control device 12, such as a digitally controlled solenoid valve having a first position 20 and a second position 22. Control device 12 is controlled by control module 24 that receives input signals from sensors 16 associated with temperatures and/or other component operating parameters of a work vehicle in a well known manner. Under normal operating conditions, the ambient temperature of the hydraulic oil or suitable fluid of a fluid circuit 28 can be greater than a predetermined minimum temperature in which heating of hydraulic oil is not needed. For example, 90° C. in one operating condition, and in combination with other parameters in other applications and/or embodiments such as discussed in further detail below, hydraulic pump 26 such as a variable displacement pump provides pressurized hydraulic oil at the discharge of pump 26 to control device 12 of fluid circuit 28 as indicated by directional arrows 36 along line 38. Discharge pressure is also provided to a control valve 48 such as a directional loader valve which operates in a well known manner that is not further discussed herein. In response to control module 24 sensing the temperature of the hydraulic oil in fluid circuit 28, as well as other temperature/parameters such as discussed in further detail below, control device 12 is maintained in first position 20, including a load sense network 50 providing a load sense pressure 14 along line 34 to pump 26 in a known manner to control the discharge pressure of pump 26. As further shown in FIG. 1, when control device 12 is maintained in first position 20, pressurized hydraulic oil from pump 26, as indicated by directional arrows 36 along line 38 is prevented from flowing through control device 12.

However there are operating conditions in which hydraulic oil is less than a predetermined minimal temperature, in which case it is desirable to heat the hydraulic oil. One way to quickly heat the hydraulic oil is to not only increase the pressure in the fluid circuit, but also to cause the pressurized hydraulic fluid to flow within the fluid circuit. For example, in one operating condition, such as 0° C. and in combination with other parameters and other embodiments disclosed in further detail below, heating and flow of the hydraulic oil is desired, i.e., pump 26 to provide pressurized hydraulic oil to a return tank 32 of fluid circuit 28. That is, in response to control module 24 sensing the temperature of the hydraulic oil and fluid circuit 28, as well as other temperature/parameters that are less than predetermined minimum values such as discussed in further detail below, control device 12 is actuated to a second position 22 by control module 24.

As shown in FIG. 2, with control device 12 in second position 22, flow of pressurized hydraulic oil is permitted by control device 12, such as in flow direction 37 through line 40 of fluid circuit 28 which is downstream of control device 12. A flow restrictor 42 is positioned in line 40. In one embodiment, flow restrictor 42 is variable in size. As a result of flow restrictor 42, pressurized hydraulic oil flowing through line 40 to pressure return tank 32 is heated. As further shown in FIG. 2, second position 22 of control device 12 includes a bifurcation separating pressurized hydraulic oil flow through control device 12 into a first flow path 44 and a second flow path 46. First flow path 44 directs pressurized fluid through flow restrictor 42 and then to pressure return tank 32 along line 40. Second flow path 46 directs pressurized fluid along line 34 to pump 26. As further shown in FIG. 2, second position 22 of control device 12 prevents load sense pressure 14 from being applied by load sense network 50 through control device 12 to pump 26 via line 34. By virtue of the bifurcation in second position 22 of control device 12, pressurized fluid flowing along second flow path 46 is placed in fluid communication with line 34 to pump 26. In this arrangement, the pressurized fluid flowing along second flow path 46 along line 34 becomes the load sense pressure applied to pump 26, with the pressure magnitude of pressurized fluid flowing along second flow path 46 through line 34 to pump 26 being substantially equal to the magnitude of discharge pressure from pump 26 along line 38.

By virtue of the operation of a conventional variable displacement pump that is well-known and not further discussed in detail herein, the pump is configured to maintain a discharge pressure at a predetermined pressure differential greater than the pressure differential between the load sense pressure provided to the pump and the pump discharge pressure. As a result, as the pressure magnitude of the load sense pressure is increased, the pump is configured to operate to maintain the predetermined pressure differential by increasing the discharge pressure of the pump. Therefore, when control device 12 is maintained in second position 22, such that the discharge pressure of the pump through line 38 is essentially equal to the load sense pressure applied through line 34 to pump 26 (i.e., the difference in pressure between the discharge pressure of the pump and the load sense pressure being less than the predetermined pressure differential), pump 26 begins generating a continually increasing discharge pressure, within the operational confines of the pump and/or fluid system, until control module 24 urges control device 12 to actuate from second position 22 to first position 20. Once control device 12 is actuated to first position 20, a resumption of the load sense pressure 14 upstream of control device 12 is provided by load sense network 50 to line 34 to pump 26, which load sense pressure 14 corresponding to the pressure required to satisfy the demand of the fluid circuit 28 to operate a portion of fluid system/subsystem, such as an implement of the work vehicle.

Stated another way, control module 24 actuating control device 12 to second position 22 results in maintaining an artificial load sense pressure that is equal to the discharge pressure of pump 26. As a result, pump 26 continually increases the discharge pressure as the pump 26 attempts to generate a predetermined pressure differential between the load sense pressure and the pump discharge pressure, which discharge pressure flowing through flow restrictor 42 along first flow path 44 to pressure return tank 32, thereby quickly increasing the temperature of the hydraulic oil in fluid circuit 28. That is, the arrangement of the control device 12 reduces the amount of time required to reach a nominal hydraulic oil operating temperature, while operating independent of or not requiring continuous interaction from the operator, such as by actuating an optional operator-controlled switch 49 that temporarily overrides control module 24 or otherwise results in control device 12 being actuated to second position 22. In another embodiment, operation of fluid heating system 10 may be automatic, i.e., so as not to require interaction from the operator.

An optional heat exchanger 18 may be utilized by fluid circuit 28, such as for purposes of thermal exchange with other system(s) and/or subsystem(s) such as discussed in more detail below. The location of heat exchanger 18 may be utilized anywhere downstream of flow restrictor 42 and between pressure return tank 32 of fluid circuit 28.

It is to be understood that the size of the restrictions of control device 12 and second position 22 may be optimized to generate a specific heat load.

This solution can also solve an additional problem relating to working vehicles, such as diesel burning wheel loaders with Selective Catalytic Reduction (SCR) exhaust treatment. On some of these vehicles, the engine must be periodically warmed above a certain temperature when idling for extended periods of time, such as more than six hours, to prevent damage to the vehicle. The system 10 embodiment described above can be used to increase the temperature of the diesel engine (and in turn the SCR system) by creating a parasitic load on the engine in the same manner as described earlier. By energizing control device 12 to second position 22, the temperature of the diesel engine can be elevated above this threshold temperature automatically, again independent of or without any input from the operator. This arrangement has an additional advantage of substantially eliminating external movement or motion such as might be associated might when loading the engine via the ground drive or implement hydraulic cylinders. Substantially eliminating such external movement or motion of the work vehicle reduces danger and risk to objects and personnel near the work vehicle while permitting a process that can be automatically performed. It is to be understood that system 10 would be operated at predetermined time intervals less than those resulting in damage to the vehicle.

Control device 12 operation can also be utilized, such as via heat exchanger 18 to warm a frozen urea tank more quickly, reducing the time to operation of the work vehicle in cold temperatures, the urea used as a reductant within the SCR system.

It is to be understood that the terms fluid and hydraulic oil may be used interchangeably when referring to the substance that flows in the fluid heating systems. That is, hydraulic oil or a suitable fluid may be utilized in the fluid heating systems.

Figure 3:
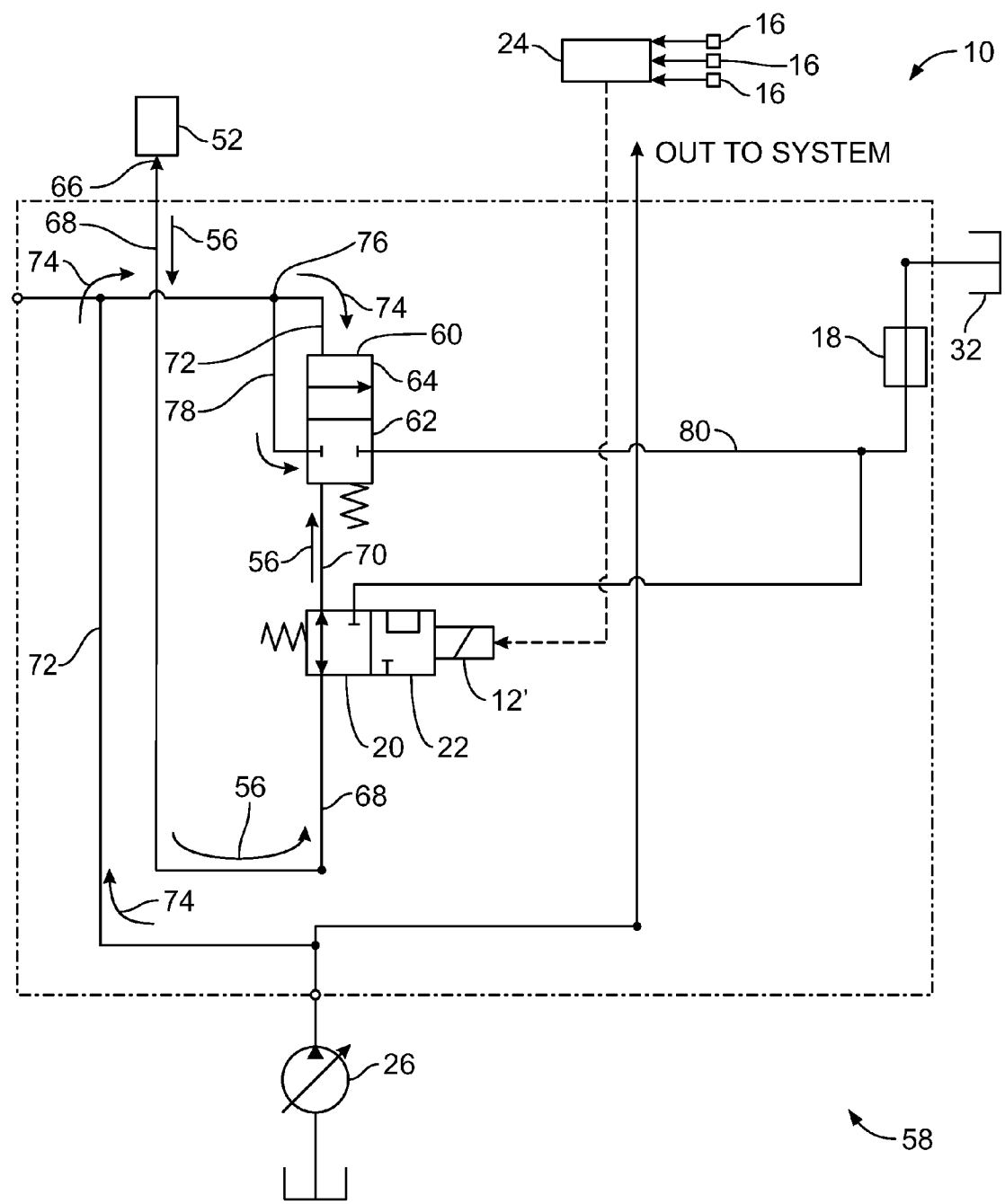
FIGS. 3 and 4 are schematic depictions of an exemplary embodiment of a fluid heating system of the present disclosure.
Figure 4:
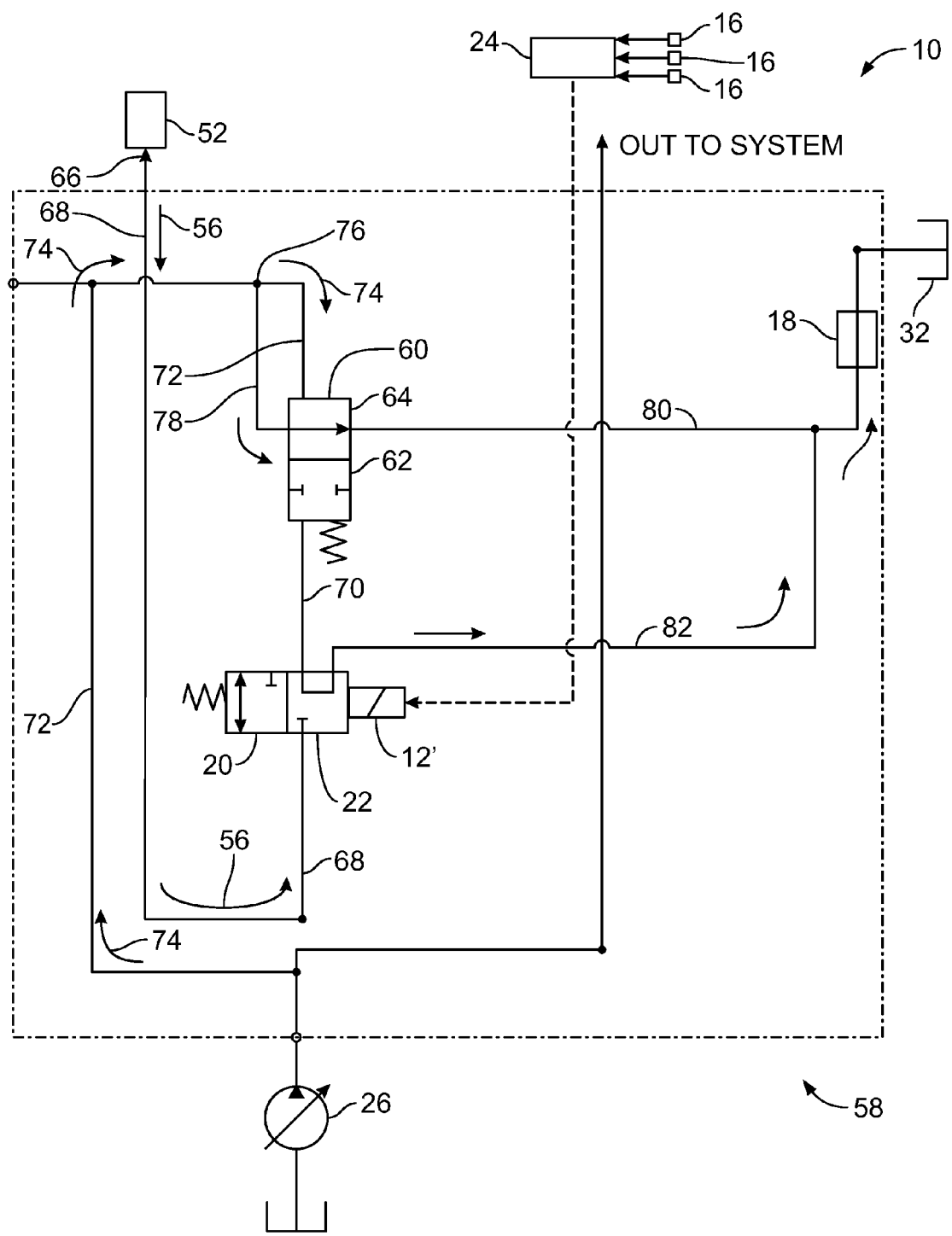

Referring to the drawings, FIGS. 3-4 show schematic representations of an exemplary embodiment of the present disclosure. FIG. 3 shows fluid heating system 10 including a control device 12', such as a digitally controlled solenoid valve having first position 20 and second position 22, and another control device 60, such as a margin relief valve having a third position 62 and a fourth position 64. Control device 12' is controlled by control module 24 that receives input signals from sensors 16 associated with temperatures and/or other component operating parameters of a work vehicle in a well known manner. When control device 12' is maintained in first position 20, fluid pressurized to a load sense pressure 66 generated by a load sense network 52 is provided to control device 12' of the fluid circuit 58 as indicated by directional arrows 56 of line 68. Further, as a result of control device 12' being maintained in first position 20, pressurized fluid at load sense pressure 66 passes through first position 20 of control device 12' and is brought into fluid communication with control device 60 in line 70 for urging or actuating control device 60 from fourth position 64 to third position 62.

As further shown in FIGS. 3 and 4, pump 26 such as a variable displacement pump provides pressurized hydraulic oil from pump 26 to control device 60 of flow circuit 58 as indicated by directional arrows 74 along line 72 for urging or actuating control device 60 from third position 62 to fourth position 64. At junction 76, line 72 bifurcates to a line 78 providing pressurized hydraulic oil to one side of third position 62 of control device 60. As a result of this arrangement, with control module 24 actuating control device 12' to first position 20, pressurized hydraulic oil at load sense pressure 66 is provided along line 68 and then line 70 to control device 60. The force applied by pressurized hydraulic oil to control device 60 by load sense pressure 66 is sufficient to overcome pressurized hydraulic oil at discharge pressure from pump 26 provided along line 72 for urging control device 60 toward fourth position 64, thereby maintaining control device 60 in third position 62 in preventing a flow of hydraulic oil along a line 80 to a pressure return tank 32. In other words, as a result of control device 12' being actuated to first position 20, pressurized hydraulic oil from pump 26 is prevented from flowing to pressure return tank 32.

Conversely, as further shown in FIG. 4, when control module 24 moves or actuates control device 12' from first position 20 to second position 22, fluid pressurized at a load sense pressure 66 generated by load sense network 52 is provided to control device 12' of the fluid circuit 58 as indicated by directional arrows 56 of line 68. However, as a result of control device 12' being maintained in second position 22, pressurized fluid at load sense pressure 66 is prevented from being brought into fluid communication with control device 60 via line 70 for urging or actuating control device 60 from fourth position 64 to third position 62, with residual pressurized fluid in line 70 being vented along a line 82 to pressure return tank 32. As a result of this arrangement, with control module 24 actuating control device 12' to second position 22, the force applied by pressurized hydraulic oil to control device 60 by pressurized hydraulic oil at discharge pressure from pump 26 provided along line 72 overcomes the spring force of control device 60, thereby resulting in control device 60 being actuated or urged into movement from third position 62 to fourth position 64. Upon control device 60 being actuated or urged into movement from third position 62 to fourth position 64, hydraulic oil at the discharge pressure of pump 26 from line 72 to line 78, through fourth position 64 of control device 60, to line 80 and then to pressure return tank 32. In addition, the passageway or channel formed in the fourth position 64 of control device 60 is sized to form a restriction relative to at least opposed lines 78, 80 the fluid circuit 58. As a result of the restriction formed in the fourth position 64 of control device 60, the resulting flow of pressurized hydraulic oil through the restriction toward the pressure return tank 32 results in the hydraulic oil of fluid circuit 58 being heated.

Stated another way, in a spring-biased position, control device 12' allows normal operation of the fluid circuit 58, by connecting the spring-side signal port of the margin relief valve or control device 60 to the load sensing control signal or load sense pressure 66. When determined appropriate by control module 24, such as based on feedback signals or a control routine, control device 12' is energized or actuated and the spring-side signal port of the margin relief valve or control device 60 is vented to the return tank line while the load-sensing control signal or load sense pressure is blocked. In this case, the margin relief or control device 60 will open fully and allow pump flow to pass directly to the pressure return tank 32. The pump 26 will produce flow at its pressure-compensated set point, generating heat and warming the hydraulic oil.

It is to be understood that the fluid heating system shown in FIGS. 3 and 4 could also be used to address the problem relating to SCR exhaust treatment and urea tank, both as previously discussed and as further discussed below.

There are at least four different uses of the control device(s) identified in FIGS. 1-4:
1. Heating the air temperature inside the cab more quickly
2. Periodically elevating the engine temperature to combat hydrocarbon build-up in SCR system
3. More rapidly warming the urea tank
4. More rapidly warming the hydraulic oil.

In one embodiment, feedback signals received from various sensors provided to the electronic control module may include the following operating parameters:
Ambient Temperature
Coolant Temperature
Transmission Oil Temperature
Hydraulic Oil Temperature
Urea Temperature
Engine Speed
Fan Reverser state
Auto Fan state
However, in other embodiments, other combinations of feedback signals, possibly including additional parameters may be utilized.

One embodiment relates to heating the air temperature inside the operator cab more quickly. For example, to turn ON the feature (i.e., energize the control valve or control device 12, 12') all of the following conditions must be met for a predetermined period of time, such as 20 consecutive seconds, although in other embodiments other time periods of different duration and/or different parameters may be used:
Ambient Temperature <0° C.
Coolant Temperature <75° C.
Transmission Oil Temperature <75° C.
Hydraulic Oil Temperature <75° C.
Engine Speed >650 RPM
Fan Reverser state=Not Active
Auto Fan=ON In this embodiment, once the valve or control device 12, 12' is energized (ON), auto fan control is be disabled and fan speed should be set to maximum fan speed.

In this embodiment, once the valve or control device 12, 12' is energized, any of the following conditions may be used to turn the valve or control device 12, 12' OFF, although in other embodiments, the number and amount of conditions may be different:
Charge Air Temperature >90° C.
Coolant Temperature >85° C.
Transmission Oil Temperature >90° C.
Hydraulic Oil Temperature >90° C.
Engine Speed <600 RPM
Fan Reverser=Active In this embodiment, if any parameter for entry or exit condition of this routine is not present or out of range, then the feature is disabled.

In one embodiment, to periodically elevate the engine temperature to combat hydrocarbon build-up in the SCR system: To turn ON the feature (i.e., energized the valve or control device 12, 12') the following conditions are to be met for X1 consecutive seconds:

Coolant Temperature <Y1° C.

Once the valve or control device 12, 12' is energized, auto fan control is to be disabled and fan speed is to be set to maximum fan speed.

Once the valve or control device 12, 12' is energized, the following conditions may be used to turn the valve OFF:

:Temperature >YY1° C. for Z1 consecutive seconds (YY1≥Y1)

If the Coolant Temperature signal is not present or out of range, then the feature is to be disabled.

In one embodiment, to more rapidly warm the urea tank: To turn ON the feature (i.e., energize the valve or control device 12, 12') the following conditions are to be met for X2 consecutive seconds:

Urea Temperature <Y2° C.

Once the valve or control device 12, 12' is energized, auto fan control is to be disabled and fan speed set to maximum fan speed.

Once the valve or control device 12, 12' is energized, the following conditions may be used to turn the valve OFF:

Urea Temperature >YY2° C. for Z2 consecutive seconds (YY2≥Y2)

If the: Urea Temperature signal is not present or out of range, then the feature is to be disabled.

In one embodiment, to more rapidly warm the hydraulic oil:

To turn ON the feature (i.e., energize the valve or control device 12, 12') the following conditions are to be met for X3 consecutive seconds:

Hydraulic Oil Temperature <Y3° C.

Once the valve or control device 12, 12' is energized, auto fan control is to be disabled and fan speed set to maximum fan speed.

Once the valve or control device 12, 12' is energized, the following conditions are to turn the valve OFF:

Hydraulic Oil Temperature >YY3° C. for Z3 consecutive seconds (YY3≥Y3)

If the: temperature signal is not present or out of range, then the feature is to be disabled.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fluid heating system for a work vehicle comprising:

a pressurized fluid circuit having a pump with an output and a load sense pressure line for providing pressurized fluid to the fluid circuit, the pump being operable to increase output to maintain a pressure differential between the output and the load sense pressure line;

a control module for controlling a first control device in fluid communication with the fluid circuit, the first control device operable between a first position and a second position;

wherein the first position of the first control device permitting a load sense network pressure to be applied through the first control device to the load sense pressure line of the pump and preventing pressurized fluid from the pump output from flowing to a pressure return tank through a fluid flow restriction in fluid communication between the first control device and the pressure return tank for heating the pressurized fluid;

wherein the second position of the first control device preventing the load sense network pressure from being applied through the first control device to the load sense pressure line of the pump and permitting pressurized fluid from the pump output to flow to the pressure return tank through the fluid flow restriction in fluid communication between the first control device and the pressure return tank and resulting in heating of pressurized fluid of the fluid circuit;

wherein in the second position of the first control device, pressurized fluid from the pump output is bifurcated into a first flow path and a second flow path, the first flow path being in fluid communication with the pressure return tank, the second flow path being in fluid communication with the load sense pressure line of the pump; and wherein the second flow path becomes the load sense pressure applied to the load sense pressure line of the pump, resulting in continuously increasing discharge pressure generated by the pump.

2. The fluid heating system of claim 1, wherein the control module receives signals from sensors corresponding to work vehicle parameters.

3. The fluid heating system of claim 1, further comprising a heat exchanger in thermal communication between the fluid circuit and one of a system and subsystem of the work vehicle.

4. The fluid heating system of claim 3, wherein the heat exchanger increases a temperature interior of a cab of the work vehicle.

5. The fluid heating system of claim 3, wherein the control module operates the first control device to selectively cause the heat exchanger to selectively increases an engine temperature.

6. The fluid heating system of claim 5, wherein the control module operates the first control device to selectively cause the heat exchanger to selectively increases the engine temperature at predetermined time intervals.

7. The fluid heating system of claim 3, wherein the fluid circuit operates independent of external movement of an implement.

8. The fluid heating system of claim 1, wherein the fluid circuit operates independent of external movement of an implement.

9. The fluid heating system of claim 1, wherein the fluid circuit operates substantially independent of input from an operator.

10. The fluid heating system of claim 1, wherein the fluid circuit operates independent of input from an operator.

11. The fluid heating system of claim 1, comprising a second control device in fluid communication with the first control device, the second control device operable between a third position and a fourth position, wherein the first position of the first control device maintains the second control device in the third position;

wherein the second position of the first control device maintains the second control device in the fourth position.

12. The fluid heating system of claim 11, wherein in the second position of the first control device, the load sense network pressure contained in a conduit between the first control device and the second control device is permitted to flow to the pressure return tank.

13. The fluid heating system of claim 11, wherein the fourth position of the second control device provides a further flow restriction in the fluid circuit, thereby further heating the fluid of the fluid circuit.

14. A method for heating a work vehicle comprising:
providing a pressurized fluid circuit having a pump with an output and a load sense pressure line for providing pressurized fluid to the fluid circuit, the pump being operable to increase output to maintain a pressure differential between the output and the load sense pressure line;
providing a control module for controlling a first control device in fluid communication with the fluid circuit, the first control device operable between a first position and a second position;
wherein the first position of the first control device permitting a load sense network pressure to be applied through the first control device to the load sense pressure line of the pump, and preventing pressurized fluid from the pump output from flowing to a pressure return tank through a fluid flow restriction in fluid communication between the first control device and the pressure return tank for heating the pressurized fluid;
wherein the second position of the first control device preventing the load sense network pressure from being applied through the first control device to the load sense pressure line of the pump, and permitting pressurized fluid from the pump output to flow to the pressure return tank through the fluid flow restriction in fluid communication between the first control device and the pressure return tank and resulting in heating of pressurized fluid of the fluid circuit; and
selectively actuating the first control device between the first position and the second position;
wherein in the second position of the first control device, pressurized fluid from the pump output is bifurcated into a first flow path and a second flow path, the first flow path being in fluid communication with the pressure return tank, the second flow path being in fluid communication with the load sense pressure line of the pump; and
wherein the second flow path becomes the load sense pressure applied to the load sense pressure line of the pump, resulting in continuously increasing discharge pressure generated by the pump.

15. The method of claim 14, comprising a second control device in fluid communication with the first control device, the second control device operable between a third position and a fourth position,
wherein the first position of the first control device maintains the second control device in the third position;
wherein the second position of the first control device maintains the second control device in the fourth position.

16. The method of claim 15, wherein the fourth position of the second control device provides a further flow restriction in the fluid circuit, thereby further heating the fluid of the fluid circuit.

* * * * *